United States Patent
Inoue et al.

(10) Patent No.: US 8,139,461 B2
(45) Date of Patent: Mar. 20, 2012

(54) RECORD MEDIUM, OPTICAL DISK UNIT USING IT, AND RECORDING METHOD

(75) Inventors: Shohei Inoue, Fukuoka (JP); Hideaki Horio, Fukuoka (JP); Taiichi Mori, Fukuoka (JP); Tetsuya Araki, Fukuoka (JP); Kouichi Bairin, Fukuoka (JP)

(73) Assignee: Panasonic Corporation, Osaka (JP)

( * ) Notice: Subject to any disclaimer, the term of this patent is extended or adjusted under 35 U.S.C. 154(b) by 53 days.

(21) Appl. No.: 12/631,638

(22) Filed: Dec. 4, 2009

(65) Prior Publication Data

US 2010/0149945 A1    Jun. 17, 2010

(30) Foreign Application Priority Data

Dec. 4, 2008    (JP) .................................. 2008-309402

(51) Int. Cl.
*G11B 7/00* (2006.01)

(52) U.S. Cl. ......................................................... 369/103
(58) Field of Classification Search .................... 369/103
See application file for complete search history.

(56) References Cited

U.S. PATENT DOCUMENTS 7,388,695 B2 *    6/2008    Lawrence et al. ................. 359/3

* cited by examiner

*Primary Examiner* — Latanya Bibbins
(74) *Attorney, Agent, or Firm* — Dickinson Wright PLLC

(57) ABSTRACT

A plate body 2, multiple hologram layers 3 are provided in the thickness direction of the plate body 2, and at least one of the multiple hologram layers 3 is formed of spirally continuous hologram bands 4. Erasure areas 4A and 4B and non-erasure areas 4C and 4D of the hologram band 4 are provided in the length direction of the hologram band 4. Non-erasure areas 4E and 4F of the hologram band 4 are formed on both sides in the direction orthogonal to the length direction of the hologram band 4 in the erasure areas 4A and 4B.

5 Claims, 7 Drawing Sheets

RECORD MEDIUM, OPTICAL DISK UNIT USING IT, AND RECORDING METHOD

BACKGROUND

1. Field of the Invention

This invention relates to a record medium, an optical disk unit using the record medium, and a recording method.

2. Description of the Related Art

In recent years, various methods of performing multilayer recording on a record medium have been proposed to increase the record capacity.

That is, multiple micro-hologram layers are provided in a plate body in the thickness direction of the plate body; since multiple micro-hologram layers are provided, the record capacity becomes extremely large.

(Refer to Patent Document 1.)

The feature of the conventional example shown in Patent Document 1 is as follows: Since the record medium is provided with multiple micro-hologram layers, an optical disk unit using the record medium for recording and playing back can perform digital recording by applying light to a micro-hologram of a record portion of the micro-hologram layer from one side of the record medium and causing optical alteration to form a portion where the micro-hologram is erased and applying no light to form a portion where the micro-hologram is left.

At the playback time, light can be applied from one side of the record medium to the portion of the micro-hologram layer where the micro-hologram is erased and the portion where the micro-hologram is left and reflected light therefrom can be read for performing digital playback.

In contrast, in examples preceding the conventional example, to form a micro-hologram on a record medium, light must be applied from both sides of the record medium for causing optical interference to occur to form a micro-hologram. At the playback time, in the examples preceding the conventional example, light can be applied from one side of the record medium to the micro-hologram of the micro-hologram layer and reflected light therefrom can be read for performing digital playback.

That is, according to the conventional example shown in Patent Document 1, the optical disk unit for recording and playing back has the feature of a simplified structure because a light supply path needs only to be provided on one side of the record medium.

Patent Document 1: U.S. Pat. No. 7,388,695

As described above, according to the conventional example shown in Patent Document 1, a light supply path needs only to be provided on one side of the record medium for the optical disk unit for recording and playing back the record medium, so that the structure is simplified.

However, such a conventional example involves a problem of difficulty in performing tracking control.

That is, in a record medium having multiple micro-hologram layers, particularly a micro-hologram layer of an inner layer cannot be given tracking data and thus tracking data is provided on the surface of the record medium.

However, this kind of record medium is provided with an extremely large number of internal micro-hologram layers as described above and if tracking data is provided only on the surface of the record medium in spite of the state, it may become difficult to perform tracking control at the time of recording and playing back a micro-hologram layer of an inner layer.

SUMMARY

It is therefore an object of the invention to make it possible to perform appropriate tracking control at the recording time and the playback time.

To accomplish the object, the invention provides a record medium including a plate body; multiple hologram layers formed in the thickness direction of the plate body; and hologram bands formed in at least one of the multiple hologram layers, wherein an erasure area and a non-erasure area of the hologram band are provided in the length direction of the hologram band, and wherein each non-erasure area is formed on both sides in the direction orthogonal to the length direction of the hologram band in the erasure area.

As described above, the invention provides the record medium including the plate body; the multiple hologram layers formed in the thickness direction of the plate body; and the hologram bands formed in at least one of the multiple hologram layers, wherein an erasure area and a non-erasure area of the hologram band are provided in the length direction of the hologram band, and wherein the non-erasure area is formed on both sides in the direction orthogonal to the length direction of the hologram band in the erasure area, so that it is made possible to perform appropriate tracking control at the recording time and the playback time.

That is, each non-erasure area of the hologram band is also formed on both sides in the direction orthogonal to the length direction of the hologram band in the erasure area, so that the hologram of the non-erasure area existing on both sides in the direction orthogonal to the length direction of each hologram band can be used as a tracking data area and consequently even if recording or playing back on an inner hologram band is performed, the data from the tracking data area can be utilized and it is made possible to perform appropriate tracking control.

The tracking data area can be formed simply by leaving a non-erasure area on both sides of the width in the direction orthogonal to the length direction of the hologram band even in an erasure area and thus can be formed extremely stably.

DETAILED DESCRIPTION

Figure 1:
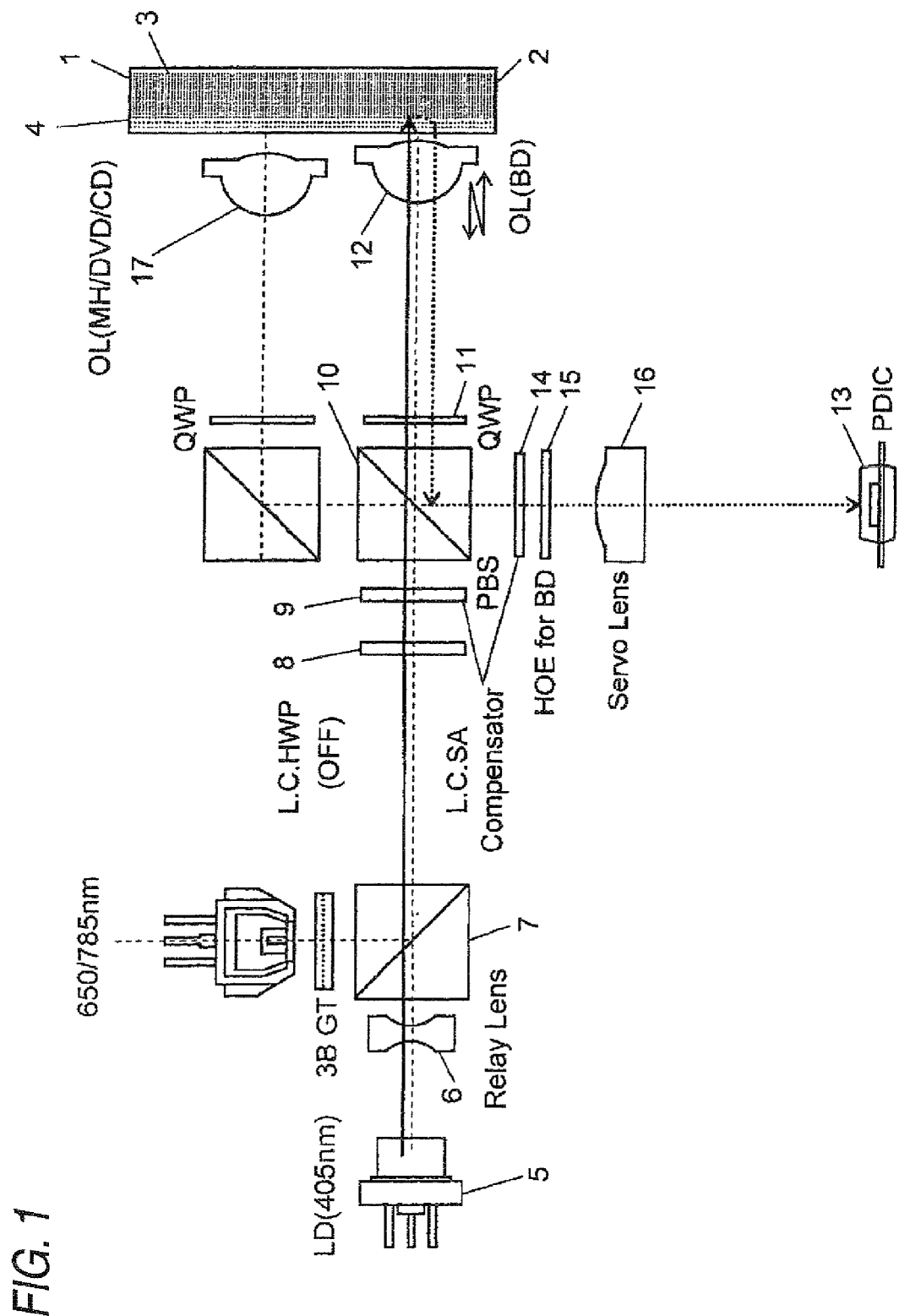
FIG. 1 is a block diagram to show an embodiment of the invention.

An embodiment of the invention will be discussed below with the accompanying drawings:

FIG. 1 shows an optical disk unit capable of recording and playing back a hologram disk (MH), a CD, a DVD, and a BD as a record medium.

To begin with, recording and playing back when a hologram disk (MH) is used as a record medium will be discussed.

A hologram disk (MH) 1 shown in FIG. 1 is formed of a plate body 2 shaped like a disk and although not shown in FIG. 1, a drive shaft is inserted into a through hole made in the center portion for rotating the disk.

Figure 2:
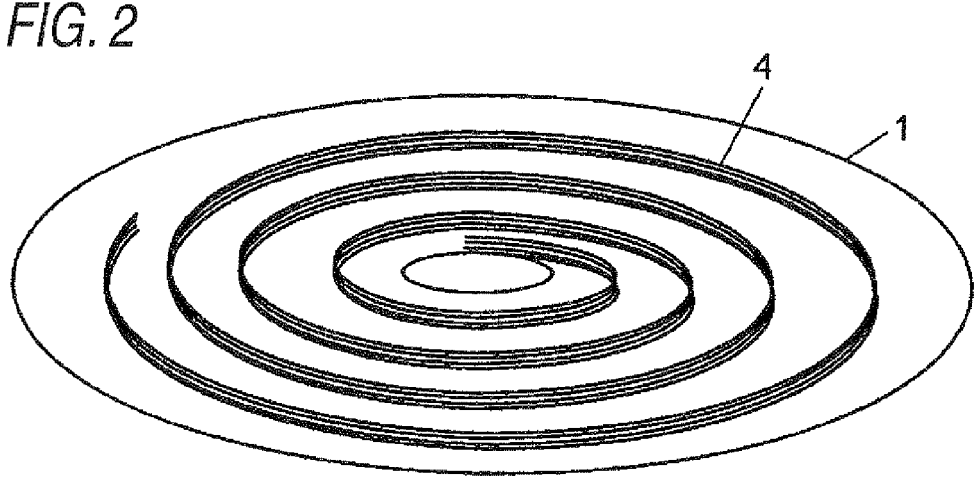
FIG. 2 is a perspective view to show a hologram disk (record medium) of the embodiment of the invention.
Figure 3:
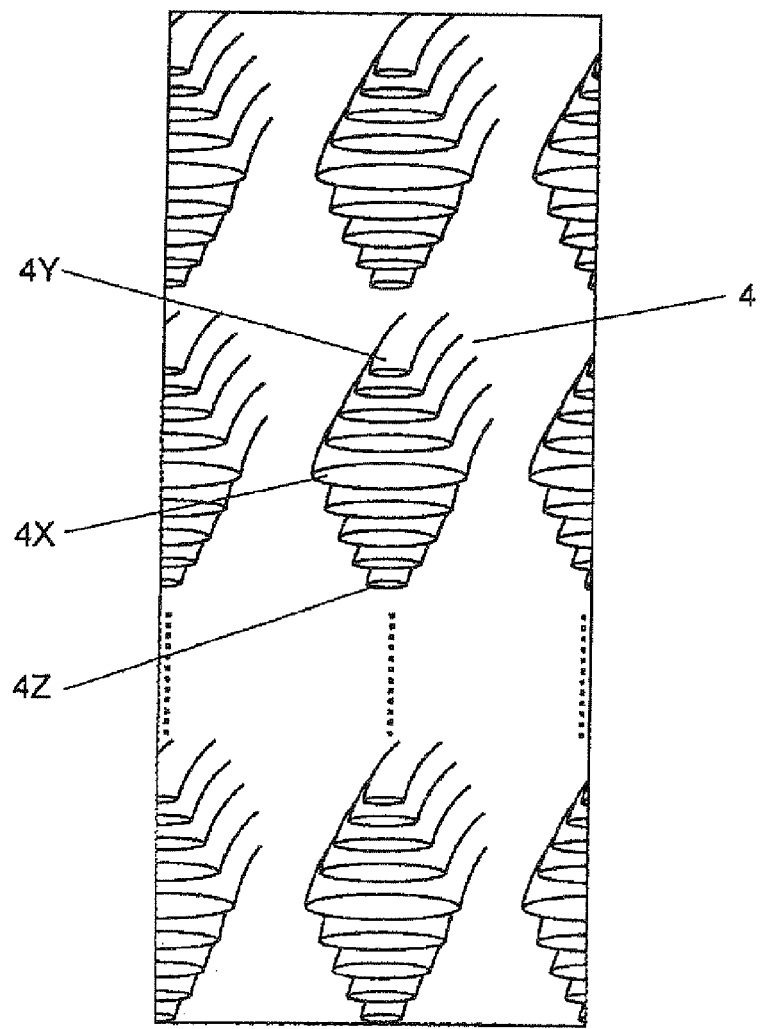
FIG. 3 is a fragmentary enlarged perspective view of FIG. 2.

As shown in FIG. 1, the hologram disk (MH) 1 used in the embodiment is previously formed with a plurality of hologram layers 3 in the plate body 2 and the plurality of hologram layers 3 are formed of continuous spiral hologram bands 4 as shown in FIGS. 2 and 3 (the continuous spiral hologram bands 4 of the embodiment are concentrically spiral as seen in FIG. 2).

Although the bands are spiral in the embodiment, a plurality of concentric hologram bands different in diameter may be placed as one layer and a plurality of layers may be stacked.

That is, using the art described above in Patent Document 1, each hologram layer 3 made up of a plurality of hologram bands placed up and down is formed; at the recording time, light is applied to the micro-hologram band 4 and optical alteration is caused to erase the micro-hologram band 4 of the portion and the micro-hologram band 4 of a portion where no light is applied is held as the original state, namely, a non-erasure state, so that digital recording of "1" "0" can be accomplished.

At the playback time, a digital signal of "1" "0" is read and is played back.

One of the features in the embodiment is that each of the hologram layers 3 is made up of continuous spiral hologram bands 4, as shown in FIGS. 2 and 3.

Each hologram band 4 has a plurality of interference fringes in the up and down direction as shown in FIG. 3. Of interference fringes in the up and down direction, an intermediate layer portion in the up and down direction (for example, 4X) has a wide width (a direction orthogonal to the length direction of the hologram band 4); a higher layer (for example, 4Y) above the intermediate layer portion (for example, 4X) has a narrower width and a lower layer (for example, 4Z) below the intermediate layer portion (for example, 4X) has a narrower width.

Recording and playing back the hologram band 4 formed on the hologram disk (MH) 1 will be discussed below with FIGS. 1 to 3:

Blue laser light (405 nm) emitted from a laser diode 5 in FIG. 1 passes through a relay lens 6, a beam splitter 7, a liquid crystal half wave plate 8, a spherical aberration correction element 9, a beam splitter 10, and a quarter wave plate 11, and is applied to the hologram band 4 of the target layer (the target layer in the depth direction) of the hologram layers 3 through a lens 12 (to focus on the target layer (the layer in the depth direction), the distance between the lens 12 and the hologram disk (MH) 1 is made variable).

Since the time is the recording time, the laser light applied to the hologram band 4 is strengthened (about 10 times that at the reading time); accordingly, optical alteration is caused to occur in the hologram band 4 of the portion where the laser light is applied and the hologram of the portion is erased and optical alteration is not caused to occur in the hologram band 4 of the portion where the laser light is not applied and the hologram of the portion is not erased. This means that digital recording of a digital signal "1" "0" is performed.

The beam splitter 7 allows the blue laser light to pass through, but reflects red laser light and infrared laser light.

The liquid crystal half wave plate 8 changes the polarization direction by applying a voltage; it is OFF in FIG. 1.

Further, the beam splitter 10 allows P polarization to pass through and reflects S polarization.

Next, playing back will be discussed.

The dashed line in FIG. 1 indicates the signal playing back time; at this time, the laser light applied to the hologram band 4 is weakened (about one-tenth that at the writing time) and thus optical alteration does not occur in the hologram band 4 of the hologram layer 3 and devotedly a reflected wave from the hologram band 4 is received at a light reception element 13 to obtain a playback signal.

The reflected wave from the hologram band 4 once passes through the quarter wave plate 11 before arriving at the lens 12 and thus again passes through as the reflected wave and becomes from P polarization to S polarization and therefore is reflected on the beam splitter 10 and next arrives at the light reception element 13 as described above through a spherical aberration correction element 14, a BD tracking element 15, and a focus adjustment lens 16, and reading is performed.

The basic configuration and operation are seen from the description give above. Then, the largest feature in the embodiment will be discussed below:

In the embodiment, at the recording time, the blue laser light emitted from the laser diode 5 is applied to the hologram band 4 of the target layer 3 for erasing the hologram band 4 of the light-applied portion.

Figure 4:
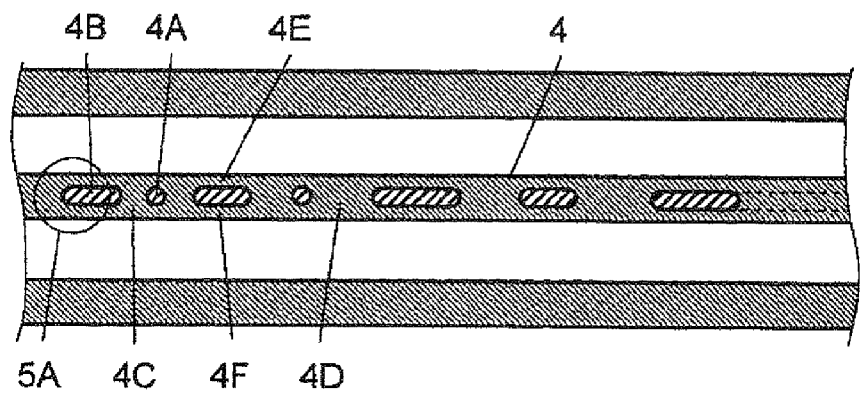
FIG. 4 is a fragmentary enlarged plan view to show the hologram disk (record medium) of the embodiment of the invention.

4A and 4B portions in FIG. 4 are erasure areas of the hologram band 4 (digital signal, for example, "0"); the erasure area 4A is a single erasure area and the erasure area 4B indicates a state in which the erasure area 4A of the hologram band 4 is formed continuously in the length direction of the hologram band 4.

In the hologram band 4 except the erasure area 4A or 4B, for example, non-erasure areas (digital signal, for example, "1") 4C and 4D are provided. The non-erasure area 40 is a single non-erasure area and the non-erasure area 4D indicates a state in which the non-erasure area 4C is formed continuously.

In the embodiment, 5A shown in the erasure area 4A in FIG. 4 denotes the blue laser light (circular light) emitted from the laser diode 5 and applied to the hologram band 4.

Figure 5:
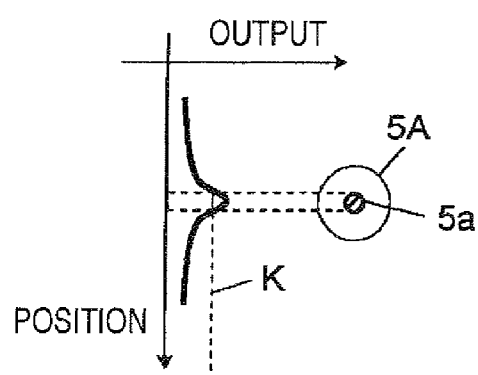
FIG. 5 is a characteristic drawing to show the energy level of laser light (circular light) 5A in FIG. 4.

It is important that at the recording time in the embodiment, as shown in FIG. 5, the blue laser light (circular light) 5A applied to the hologram band 4 has a portion exceeding an energy level K smaller than the width in the direction orthogonal to the length direction of the hologram band 4 and accordingly in the embodiment, the laser light (circular light) 5A at the recording time will be hereinafter represented as small-diameter laser light (circular light) 5a in FIG. 5.

The embodiment is more characterized by the fact that the small-diameter laser light (circular light) 5a at the recording time is applied in a state in which the center line portion in the length direction is swept so that a non-light-applied portion is produced on both sides in the length direction of the hologram band 4 as in FIG. 4.

That is, in so doing, if the laser light (circular light) 5a is emitted from the laser diode 5 as shown in FIG. 4 at the recording time, the erasure areas 4A and 4B and the non-erasure areas 4C and 4D of the hologram band 4 are formed in the length direction of the hologram band 4 and further non-erasure areas 4E and 4F of the hologram band 4 are formed on both sides of even the erasure area 4A, 4B in the direction orthogonal to the length direction of the hologram band 4.

In the non-erasure areas 4E and 4F, holograms (4X and holograms in the proximity thereof) exist as seen in FIG. 3; in the embodiment, even in the non-erasure areas 4E and 4F, the remaining holograms (4X and holograms in the proximity thereof) are utilized as tracking data.

Of course, in the non-erasure areas 4C and 4D, holograms (4X and holograms in the proximity thereof) shown in FIG. 3 exist likewise on both sides in the direction orthogonal to the length direction of the hologram band 4 and thus in conclusion, a tracking data area is formed on both sides in the direction orthogonal to the length direction of the hologram band 4 and data from the tracking data area can be utilized for making it possible to perform appropriate tracking control.

Such a tracking data area is formed even in a hologram band 4 of an inner layer. Thus, at the recording time and the playing back time of the hologram band 4 of the inner layer, data from the tracking data area can also be utilized for making it possible to perform appropriate tracking control.

Such a tracking data area can be formed even in the erasure areas 4A and 4B simply by leaving the non-erasure areas 4E and 4F on both sides in the direction orthogonal to the length direction of the hologram band 4, so that the tracking data area can be formed extremely stably.

Figure 6:
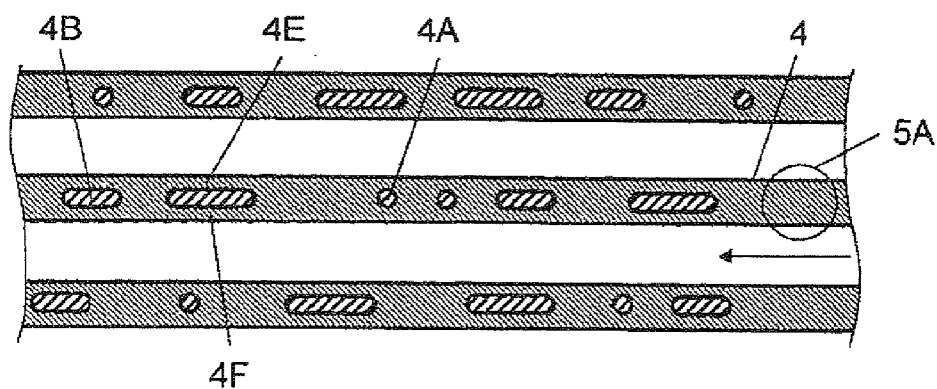
FIG. 6 is a fragmentary enlarged plan view to show the playback time in FIG. 4.
Figure 7:
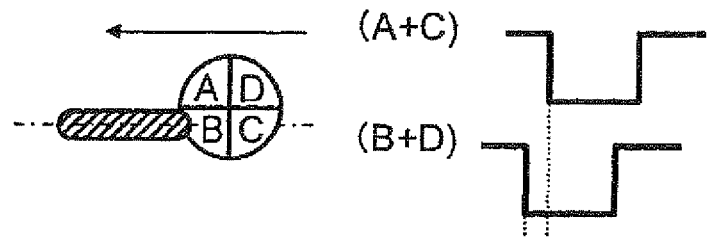
FIG. 7 is a drawing to show tracking control at the playback time in FIG. 4.
Figure 7:
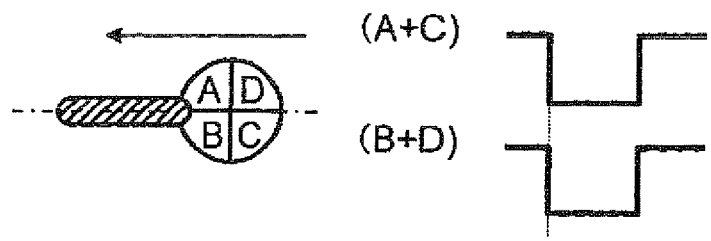
Figure 7:
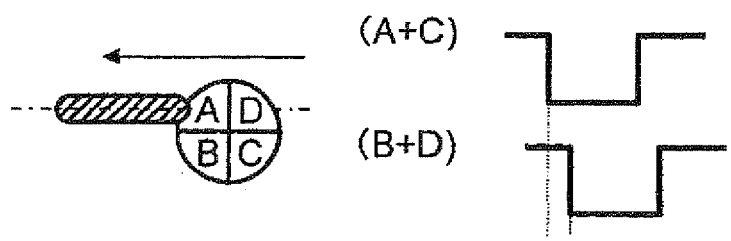
Figure 7:
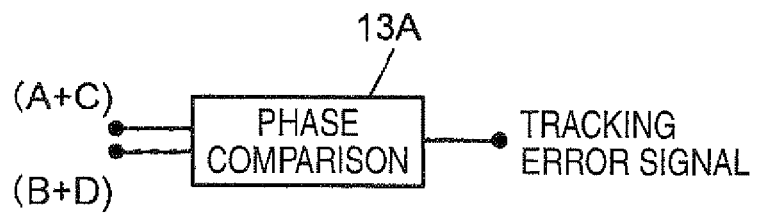

FIGS. 6 and 7 describe a state in which tracking is performed according to data from the tracking data area.

As the tracking control, a Differential Phase Detection method and a 3-beam method exist and the tracking control according to the method is well known and therefore will be only briefly discussed in the embodiment.

FIG. 6 shows the tracking control at the playback time. At this time, the laser light (circular light) 5A applied from the laser diode 5 is the laser light (circular light) 5A of the size actually appearing in the hologram band 4 because the time is the playback time.

When the laser light (circular light) 5A is swept and applied to the hologram band 4, a phase comparator (phase comparator 13A in FIG. 7) connected to the light reception element 13 detects a shift to the inside or the outside according to data from the tracking data area existing on both sides in the direction orthogonal to the length direction of the hologram band 4.

In FIG. 7 (b), no tracking shift exists; at this time, the phases A+C and B+D in the phase comparator 13A considering the phase become the same and thus tracking control of the lens 12 is not performed.

FIG. 7 (a) shows a state in which the laser light (circular light) 5A is to the side of the non-erasure area 4E of the hologram band 4; at this time, the phase of B+D is detected earlier than the phase of A+C and thus the state to the side of the non-erasure area 4E is detected and consequently tracking control is performed so as to return the lens 12 to the center.

FIG. 7 (c) shows a state in which the laser light (circular light) 5A is to the side of the non-erasure area 4F of the hologram band 4; at this time, the phase of A+C is detected earlier than the phase of B+D and thus the state to the side of the non-erasure area 4F is detected and consequently tracking control is performed so as to return the lens 12 to the center.

As described above, the embodiment has a large feature that the data from the tracking data area can be utilized for making it possible to perform appropriate tracking control.

Figure 8:
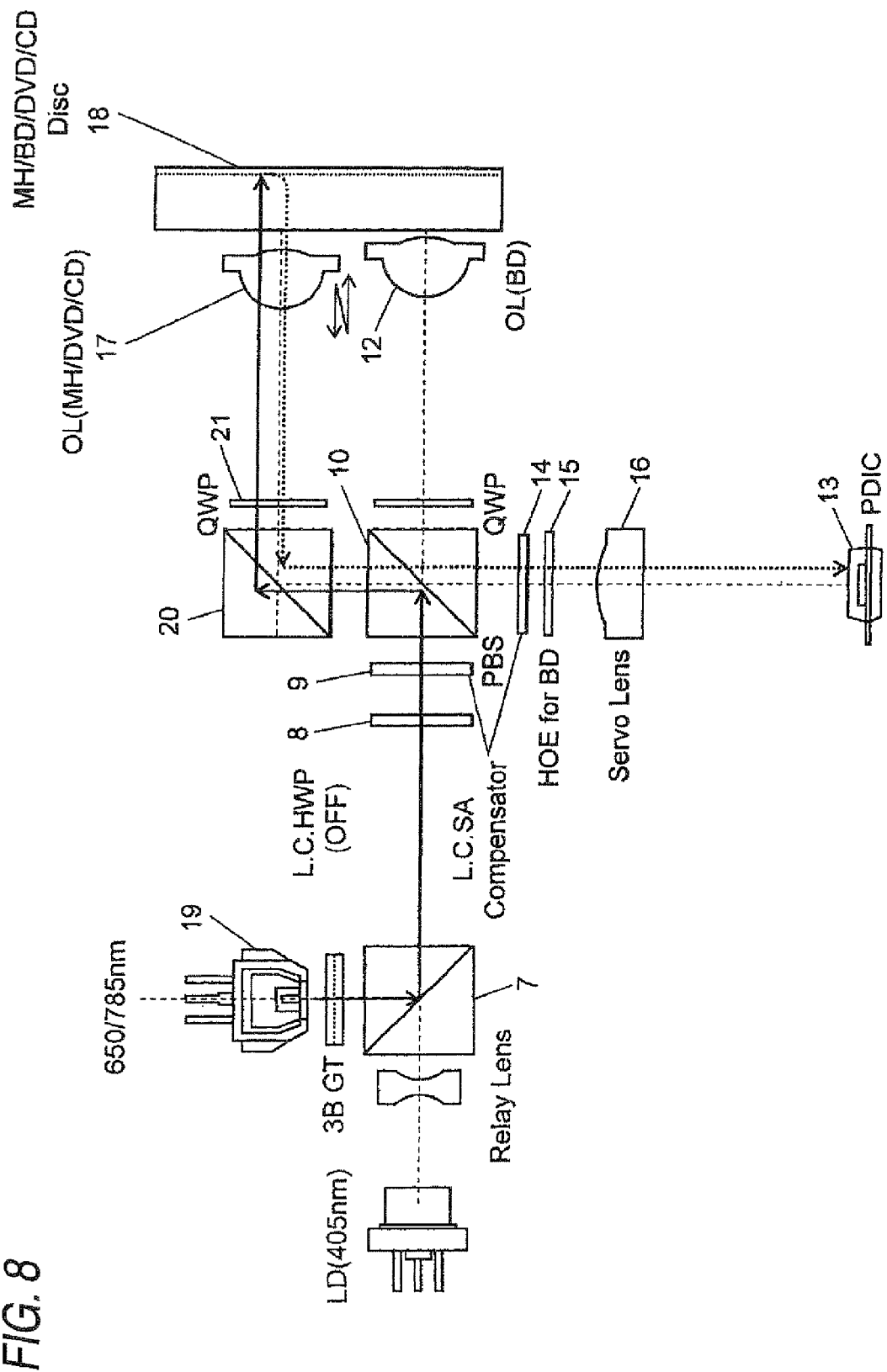
FIG. 8 is a block diagram at the recording time and the playback time of a CD in the embodiment of the invention.

FIG. 8 shows a state in which the lens 17 is utilized for recording and playing back of a CD 18.

That is, the CD 18 records a signal on a side at a distance from the lens 17 or reads a signal therefrom and thus a lens 17 having smaller NA than the lens 12 is utilized.

In this case, infrared laser light (785 nm) is emitted from a laser diode 19 and is reflected on the beam splitter 7 and a voltage is applied to the liquid crystal half wave plate 8 and thus the laser light is deflected as S polarization and is reflected on the beam splitter 10.

The infrared laser light reflected on the beam splitter 10 is reflected on a reflector 20 and passes through a quarter wave plate 21 and then is applied to the target portion of the CD 18 through the lens 17.

Since this time is the recording time, the laser light applied to the CD 18 is made stronger than that at the reading time and accordingly data is recorded on the CD 18 to which the laser light has been applied.

Next, playback of the CD 18 will be discussed.

The dashed line in FIG. 8 indicates the signal playback time; at this time, the laser light applied to the CD 18 is made weaker than that at the recording time and thus devotedly the reflected wave from the CD 18 is received at the light reception element 13 to provide a playback signal.

The reflected wave from the CD 18 once passes through the quarter wave plate 21 before arriving at the lens 17 and thus again passes through as the reflected wave and becomes from S polarization to P polarization and therefore is reflected on the reflector 20 and passes through the beam splitter 10 and next arrives at the light reception element 13 as described above through the spherical aberration correction element 14, the BD tracking element 15, and the focus adjustment lens 16.

Figure 9:
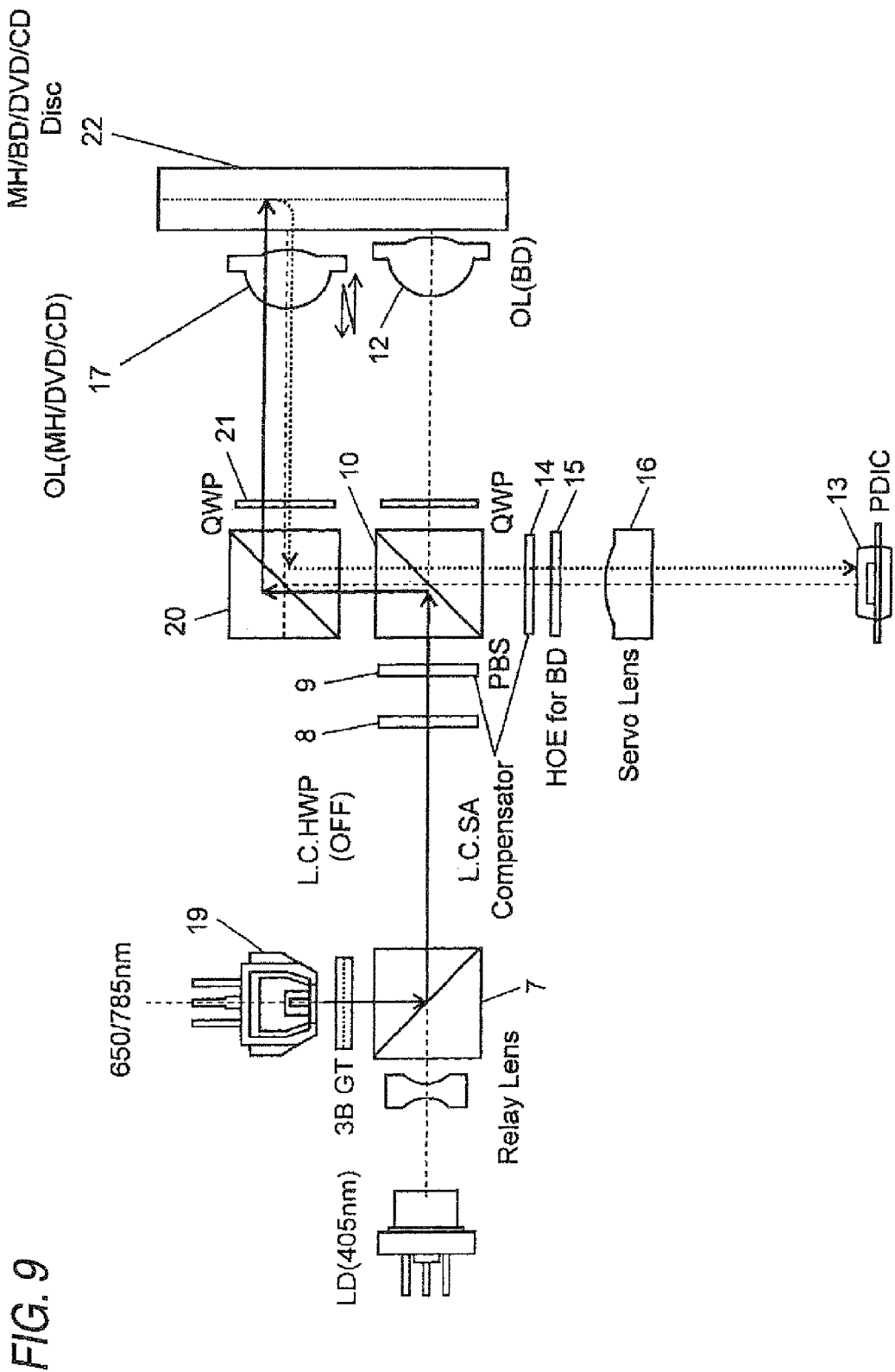
FIG. 9 is a block diagram to show the recording time and the playback time of a DVD in the embodiment of the invention.

FIG. 9 shows a state in which the relay lens 6 is utilized for recording and playing back of a DVD 22.

That is, the DVD 22 records a signal on a side at a distance from the lens 17 (center portion) or reads a signal therefrom and thus the lens 17 having small NA can be utilized.

In this case, red laser light (650 nm) is emitted from the laser diode 19 and is reflected on the beam splitter 7 and a voltage is applied to the liquid crystal half wave plate 8 and thus the laser light is deflected as S polarization and is reflected on the beam splitter 10.

The red laser light reflected on the beam splitter 10 is reflected on the reflector 20 and passes through the quarter wave plate 21 and then is applied to the target portion of the DVD 22 through the lens 17.

Since this time is the recording time, the laser light applied to the DVD 22 is made stronger than that at the reading time and accordingly data is recorded on the DVD 22 to which the laser light has been applied.

Next, playback of the DVD 22 will be discussed.

The dashed line in FIG. 9 indicates the signal playback time; at this time, the laser light applied to the DVD 22 is made weaker than that at the recording time and thus devotedly the reflected wave from the DVD 22 is received at the light reception element 13 to provide a playback signal.

The reflected wave from the DVD 22 once passes through the quarter wave plate 21 before arriving at the lens 17 and thus again passes through as the reflected wave and becomes from S polarization to P polarization and therefore is reflected on the reflector 20 and passes through the beam splitter 10 and next arrives at the light reception element 13 as described above through the spherical aberration correction element 14, the BD tracking element 15, and the focus adjustment lens 16.

Figure 10:
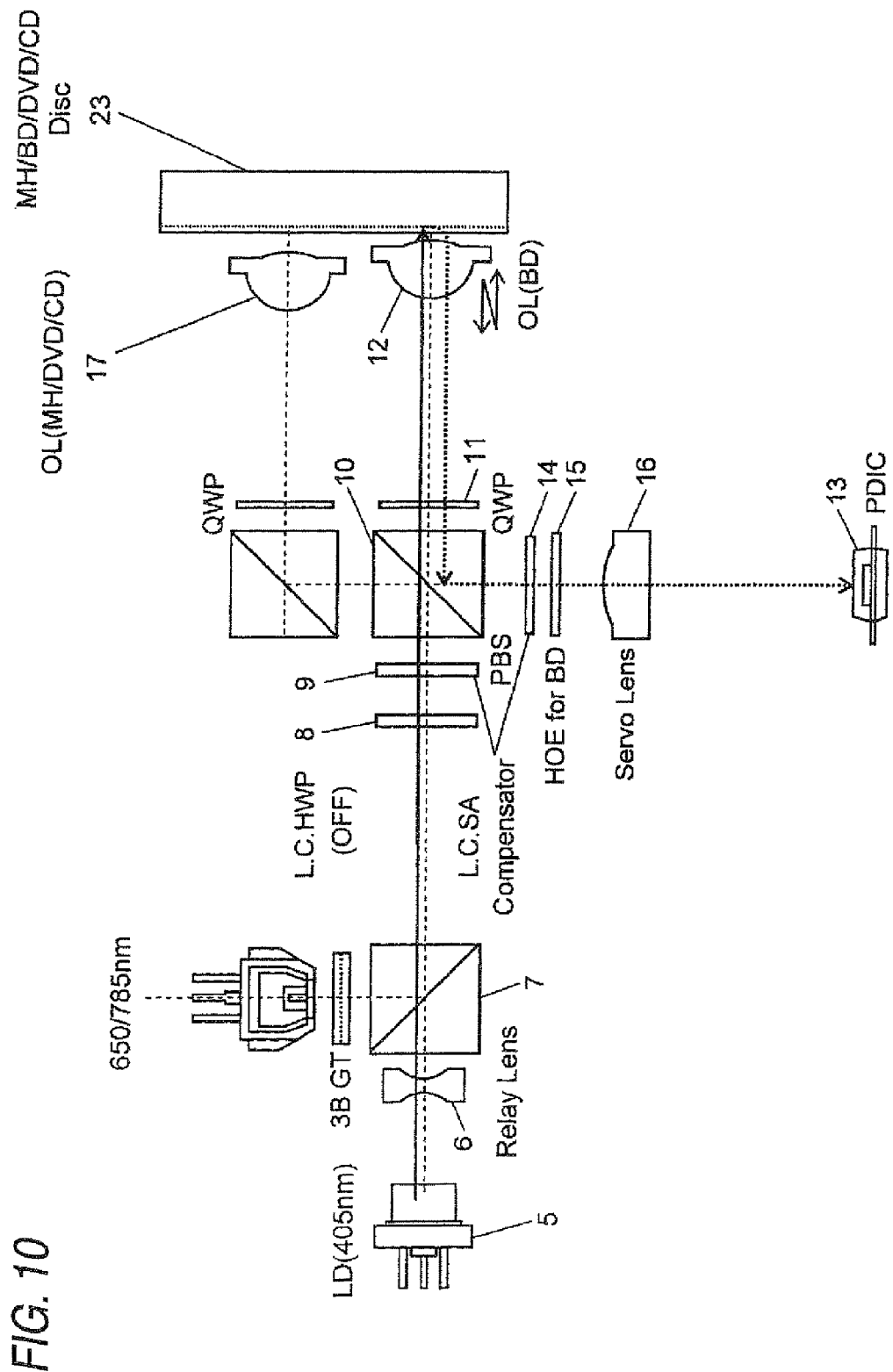
FIG. 10 is a block diagram to show the recording time and the playback time of a BD in the embodiment of the invention.

FIG. 10 shows a state in which the lens 12 is utilized for recording and playing back of a BD 23.

That is, the BD 23 records a signal in the proximity of the lens 12 or reads a signal therefrom and thus the lens 12 having large NA can be utilized.

To begin with, recording of the BD 23 will be discussed with FIG. 10.

Blue laser light (405 nm) emitted from the laser diode 5 passes through the relay lens 6, the beam splitter 7, the liquid crystal half wave plate 8, the spherical aberration correction element 9, the beam splitter 10, and the quarter wave plate 11, and is applied to the target portion of the BD 23 through the lens 12.

Since this time is the recording time, the laser light applied to the BD 23 is made stronger than that at the reading time and accordingly data is recorded on the BD 23 to which the laser light has been applied.

No voltage is applied to the liquid crystal half wave plate 8 and polarization direction is not changed.

Next, playback of the BD 23 will be discussed.

The dashed line in FIG. 10 indicates the signal playback time; at this time, the laser light applied to the BD 23 is made smaller than that at the recording time and thus devotedly the reflected wave from the BD 23 is received at the light reception element 13 to provide a playback signal.

The reflected wave from the BD 23 once passes through the quarter wave plate 11 before arriving at the lens 12 and thus again passes through as the reflected wave and becomes from P polarization to S polarization and therefore is reflected on the beam splitter 10 and next arrives at the light reception element 13 as described above through the spherical aberration correction element 14, the BD tracking element 15, and the focus adjustment lens 16.

As described above, in the invention, multiple hologram layers are provided in the plate body in the thickness direction of the plate body, at least one of the multiple hologram layers is formed of spirally continuous hologram bands, erasure areas and non-erasure areas of the hologram band are provided in the length direction of the hologram band, and each non-erasure area of the hologram band is formed on both sides in the direction orthogonal to the length direction of the hologram band in the erasure area, so that it is made possible to perform appropriate tracking control at the recording time and the playback time.

That is, each non-erasure area of the hologram band is also formed on both sides in the direction orthogonal to the length direction of the hologram band in the erasure area, so that the hologram of the non-erasure area existing on both sides in the direction orthogonal to the length direction of each hologram band can be used as a tracking data area and consequently even if recording or playing back on an inner hologram band is performed, the data from the tracking data area can be utilized and it is made possible to perform appropriate tracking control.

The tracking data area can be formed simply by leaving a non-erasure area on both sides of the width in the direction orthogonal to the length direction of the hologram band even in an erasure area and thus can be formed extremely stably.

Thus, it can be expected that the record medium will be widely utilized as a record medium of various optical disk units.

What is claimed is:

1. A record medium comprising:
a plate body;
multiple hologram layers formed in a thickness direction of the plate body; and
a hologram band formed in at least one of the multiple hologram layers, wherein:
the hologram band includes non-erasure portions on both sides of the hologram band and includes an alternating pattern of an erasure area and a non-erasure area in a center of the hologram band, and
each non-erasure portion provided on said both sides of the hologram band has tracking data.

2. The record medium as claimed in claim 1, wherein the hologram band is shaped as a spiral or a concentric circle.

3. An optical disk unit comprising:
the record medium as claimed in claim 1; and
a light supplier provided on one side of the record medium for applying light to the record medium, wherein the hologram band is recorded by the light supplier.

4. The optical disk unit as claimed in claim 3, wherein tracking control is performed using the non-erasure portions provided on both sides of the hologram band.

5. The optical disk unit as claimed in claim 3, wherein tracking control is performed using the non-erasure portions provided on both sides of the erasure area.

* * * * *